(12) United States Patent
Moreth

(10) Patent No.: US 6,176,175 B1
(45) Date of Patent: Jan. 23, 2001

(54) FRY BASKET WITH LEVER-OPERATED LID AND FINE MESH DISPOSABLE BASKET LINERS

(76) Inventor: R. Edward Moreth, 3000 Seaview Pl., Ft. Lauderdale, FL (US) 33305

(*) Notice: Under 35 U.S.C. 154(b), the term of this patent shall be extended for 0 days.

(21) Appl. No.: 09/239,508

(22) Filed: Jan. 28, 1999

(51) Int. Cl.[7] ............................................ A47J 43/18
(52) U.S. Cl. ............................ 99/408; 99/426; 99/444; 99/450
(58) Field of Search ......................... 99/407, 408, 410, 99/411, 412, 413, 414, 426, 444, 450

(56) References Cited

U.S. PATENT DOCUMENTS

| | | | |
|---|---|---|---|
| 2,716,938 | * | 9/1955 | Smith ...................................... 99/408 |
| 3,613,553 | * | 10/1971 | Popeil ..................................... 99/426 |
| 3,933,645 | * | 1/1976 | Keramidas ........................... 99/408 X |

* cited by examiner

Primary Examiner—Reginald L. Alexander

(74) Attorney, Agent, or Firm—Frank L. Kubler

(57) ABSTRACT

A fry basket and liner apparatus for immersion in cooking oil in a fryer includes a fry basket formed of wire basket mesh for retaining items to be cooked; a basket liner fit within the basket and including liner mesh having a grid finer than the basket mesh for retaining particles of fried matter separated from the food items, while the basket is immersed in the cooking oil within the fryer; so that the particles do not collect on interior surfaces of the fryer. The fry basket preferably additionally includes a hinged mesh lid forming a basket lid; and a wire handle having a trigger mechanism including structure for opening the lid. The fry basket preferably additionally includes a lid biasing spring connected to the lid in such a manner as to close the basket lid automatically. The basket lid preferably includes a lid hinge and an overlapping lid end protruding beyond the basket rim and the lid hinge; and the basket lid opening trigger mechanism preferably includes a lever abutting or hingedly connected to the overlapping lid end; a lever fulcrum secured to a fulcrum point along the length of the handle creating a lever ratio swinging the basket lid open upon gripping and squeezing the handle and lever together to pivot the lever toward the handle.

13 Claims, 4 Drawing Sheets

FRY BASKET WITH LEVER-OPERATED LID AND FINE MESH DISPOSABLE BASKET LINERS

BACKGROUND OF THE INVENTION

1. Field of the Invention

The present invention relates generally to the field of cooking equipment. More specifically the present invention relates to a fry basket with a disposable liner for retaining items to be cooked as well as loose particles of fried matter while the basket is immersed in heated cooking oil within a fryer vat. When a substantial quantity of fried matter particles have accumulated, the liner and retained matter are removed from the basket and discarded, and a new liner is fitted into the basket for further frying. In this way the fryer itself is kept clean during virtually indefinite use. The basket preferably includes a basket lid and handle with a trigger mechanism for opening the lid.

2. Description of the Prior Art

There have long been fry baskets for deep fryers which retain food items while they are immersed in heated oil. A problem with these prior baskets has been that they pass dislodged particles of fried matter such as batter into the fryer, so that these particles collect on the basket itself and on exposed fryer surfaces, making necessary periodic shut downs and difficult cleanings.

One prior attempt to solve this problem has been to taper the interior side walls of the fryer so that, at least in theory, particles abutting the walls slide down to a distant and narrow bottom wall where the oil is cooler. The cooler oil, again in theory, does not permit the particles to adhere firmly to fryer surfaces. Experience with these fryers has indicated that this approach simply does not work, and virtually the same cleaning frequency and effort is required.

It is thus an object of the present invention to provide a fry basket and liner apparatus such that the liner is formed of mesh sized to pass heated oil but to retain virtually all fried matter particles against passage into the fryer.

It is another object of the present invention to provide such an apparatus in which the liner is easy to install and to remove for disposal when heavily encrusted with fried matter particles.

It is still another object of the present invention to provide such an apparatus in which the basket has a handle and a hinged basket lid which is opened with a trigger mechanism mounted adjacent to the handle.

It is finally an object of the present invention to provide such an apparatus which is sturdy and relatively inexpensive to manufacture.

SUMMARY OF THE INVENTION

The present invention accomplishes the above-stated objectives, as well as others, as may be determined by a fair reading and interpretation of the entire specification.

A fry basket and liner apparatus is provided for immersion in cooking oil within a fryer, the apparatus including a fry basket formed of wire basket mesh for retaining items to be cooked; a basket liner fit within the basket and including liner mesh having a grid finer than the basket mesh, for retaining particles of fried matter separated from the food items while the basket is immersed in the cooking oil within the fryer; so that the particles do not collect on interior surfaces of the fryer.

The basket preferably includes a basket bottom wall; a basket front wall; a basket rear wall; and two basket side walls, where the basket front wall, basket rear wall and two basket side walls have upper edges defining in combination a basket rim. The liner preferably includes a liner bottom wall; a liner front wall; a liner rear wall; and two liner side walls, where the liner front wall, liner rear wall and two liner side walls have upper edges defining in combination a liner rim.

The apparatus preferably additionally includes at least one resilient clip for fitting over and holding together the basket rim and the liner rim and thereby releasibly holding the liner within the basket. The at least one clip is preferably a longitudinally split resilient tube, longitudinal clip edges and having outwardly protruding radial flanges extending from longitudinal clip edges sized to fit longitudinally over and grip the basket rim and the liner rim. The liner mesh is preferably 500 or 600 mesh.

The fry basket preferably additionally includes a hinged mesh lid forming a basket lid; and a wire handle having a trigger mechanism including structure for opening the lid. The fry basket preferably additionally includes a lid biasing spring connected to the lid in such a manner as to close the basket lid automatically. The basket lid preferably includes a lid hinge and an overlapping lid end protruding beyond the basket rim and the lid hinge; and the basket lid opening trigger mechanism preferably includes a lever abutting or hingedly connected to the overlapping lid end; a lever fulcrum secured to a fulcrum point along the length of the handle creating a lever ratio swinging the basket lid open upon gripping and squeezing the handle and lever together to pivot the lever toward the handle.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
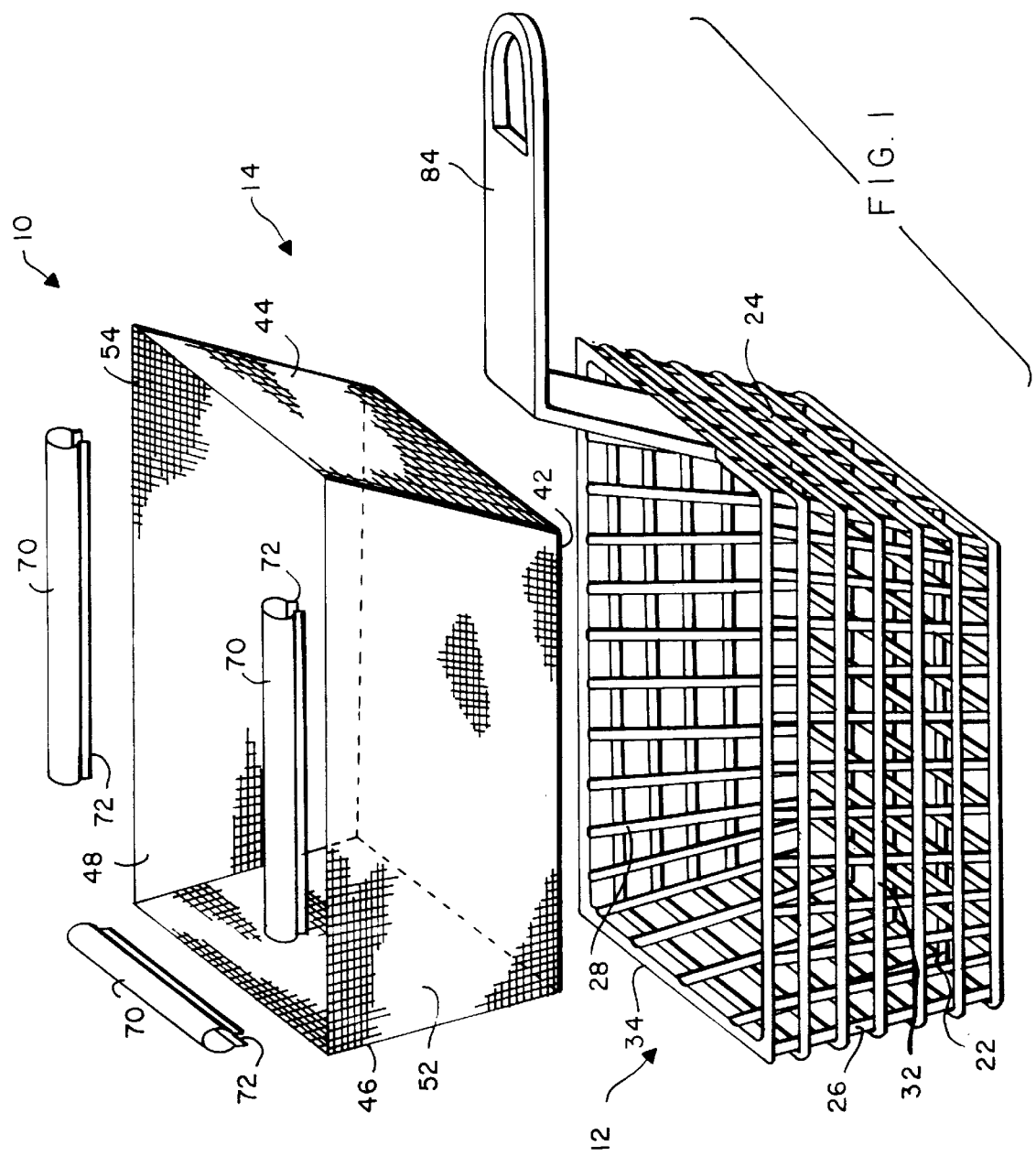
FIG. 1 is an exploded view of a conventional fry basket, the inventive liner and clips for retaining the liner in the basket.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figures 2, 3:
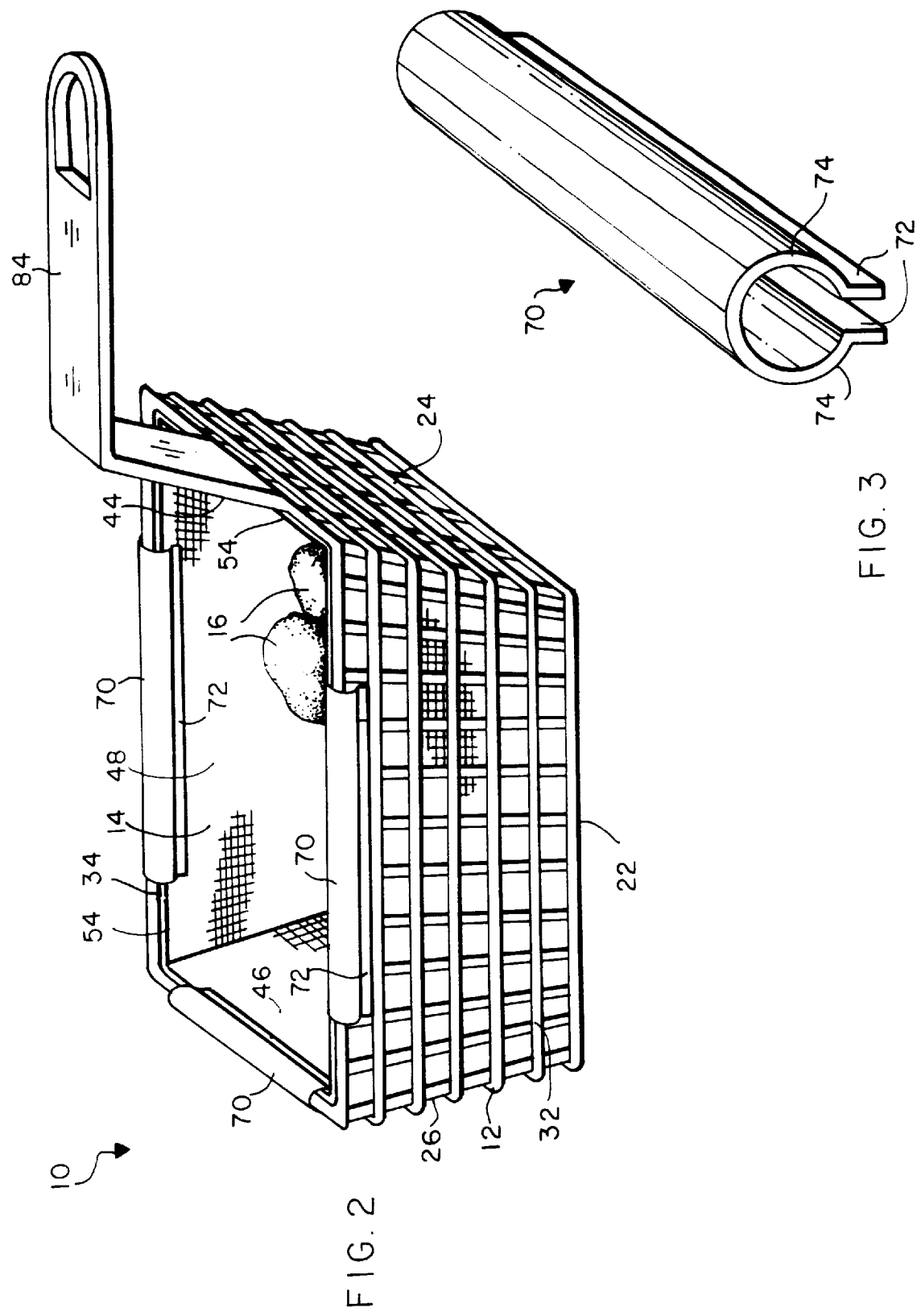
FIG. 2 is a perspective view of the basket of FIG. 1 with the liner inserted and the clips fitted onto the basket and liner rims.
FIG. 3 is a close-up perspective view of one of the preferred clips.
Figure 4:
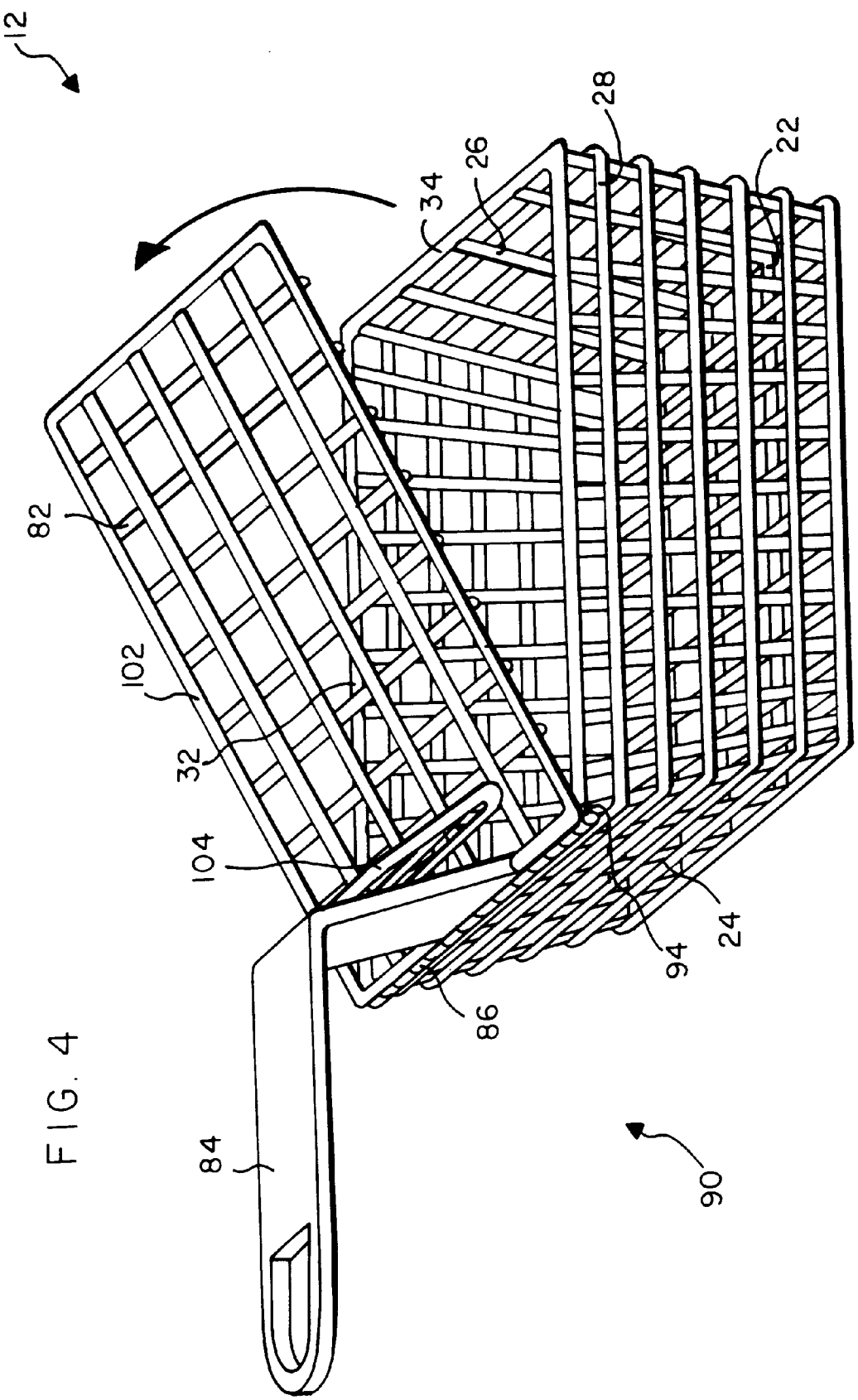
FIG. 4 is a perspective view of the inventive fry basket embodiment having the optional thumb lever section of the basket lid.
Figure 5:
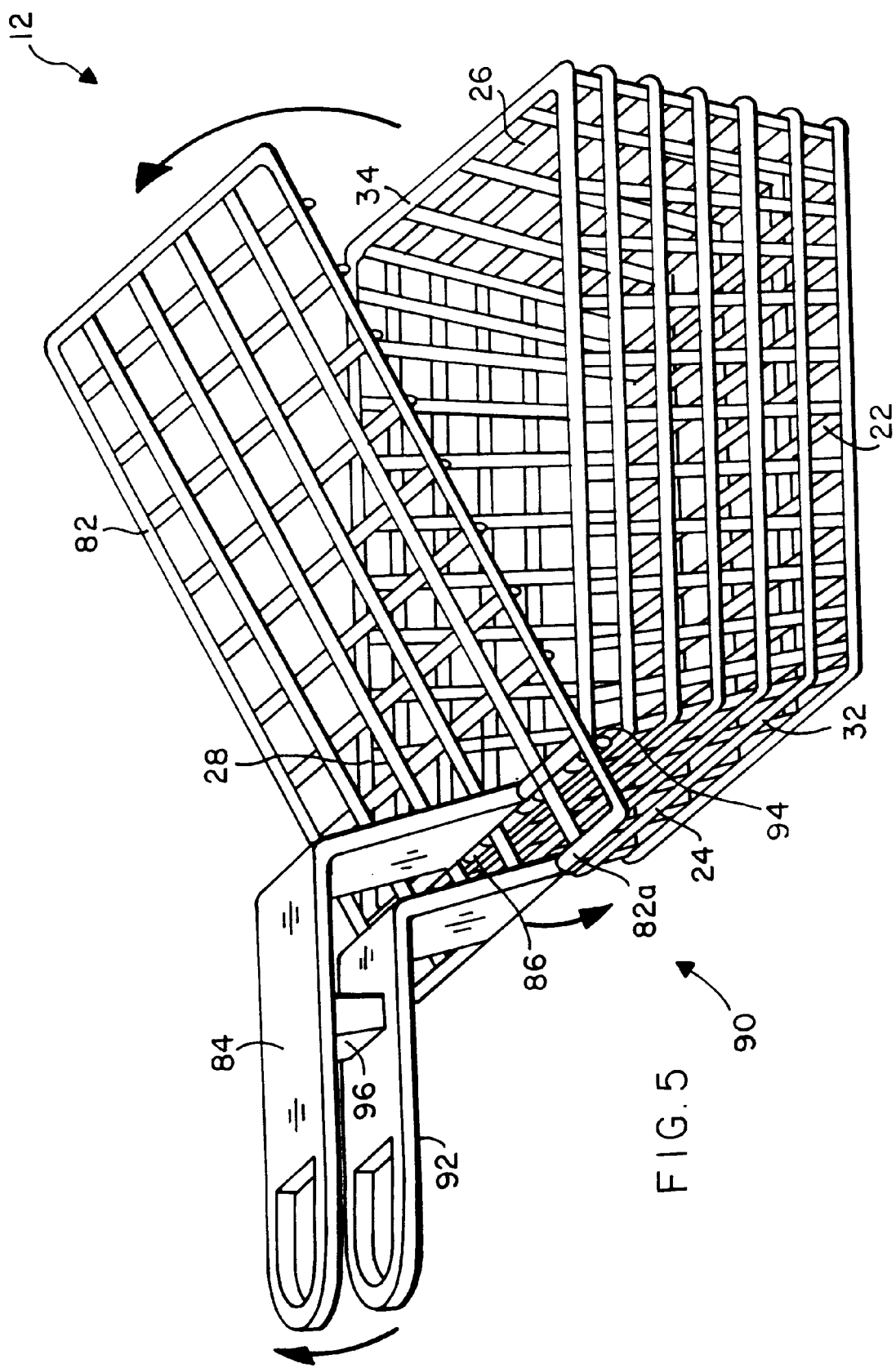
FIG. 5 is a perspective view of the inventive fry basket with the trigger mechanism operated lid.

Referring to FIGS. 1–5, an apparatus 10 including a fry basket 12 and a disposable basket liner 14 is disclosed for retaining items 16 to be cooked and as well as loose particles of fried matter while basket 12 is immersed in heated cooking oil within a fryer vat. When a substantial quantity of fried matter particles remain in basket 12 after removal of cooked food items 16, the liner 14 and retained matter are removed from the basket 12 and discarded. A new liner 14 is fitted into the basket for further frying.

Basket 12 may be of conventional design or of the improved design described in the paragraphs which follow. In either case basket 12 generally has the shape of a hollow and elongate cube which is beveled inwardly from top to bottom, and includes a basket bottom wall 22, a basket rear wall 24, a basket front wall 26, and opposing basket side walls 28 and 32, stamped from a single section of heavy wire mesh sheet. Basket walls 24-32 have upper edges defining in combination a basket rim 34.

Liner 14 is constructed of very fine mesh screen to retain loose batter and fried food particles so that they do not collect on the interior of the fryer or on the basket 12. Liner 14 is shaped to substantially match the shape of basket 12 and is sized to fit closely within basket 12, having a liner rear wall 44, a liner front wall 46 and liner side walls 48 and 52, all having upper edges defining in combination a liner rim 64, and a liner bottom wall 42.

Clips 70 are provided for releasably holding liner 14 within basket 12. See FIGS. 1 and 2. Clips 70 are preferably longitudinally split, resilient tubes having outwardly protruding radial flanges 72 extending from longitudinal clip edges 74. See FIG. 3. The clips 70 fit longitudinally over, grip and hold basket rim 34 and liner rim 54 together, thereby removably holding liner 14 within basket 12 during cooking.

Liner 14 is formed of screen, preferably 500 to 600 mesh, which is fine enough to retain virtually all loose particles of food matter and yet is wide enough to pass heated cooking oil, which has very low viscosity at frying temperatures. Liners 14 are preferably shaped during manufacture by stamping such a sheet of screen mesh in a press so that the liner 14 fits snugly into the intended fry basket 12. The basket 12 provides support to and lends some shape to the liner 14. Alternatively, liner 14 is sized and loosely shaped to fit into any of the several standard basket 12 sizes available today.

An inventive fry basket 12 is preferably provided for receiving the liner 14 described above. The basket 12 has generally the shape and dimensions of a conventional fry basket, and like other such baskets is constructed of heavier and wider wire mesh than are the liners 14 for strength to withstand repeated use. Basket 12 has the above-described general shape and additionally includes a hinged mesh lid 82 forming a basket top wall and has a wire handle 84 with a trigger mechanism 90 for opening the lid 82. The lid 82 is biased with a lid spring 94 to close automatically when trigger mechanism 90 is released.

Lid 82 includes a wire mesh basket top wall section 102 and a thumb lever section 104 bent upwardly from top wall section 102 at ninety degrees adjacent to the lid hinge 86. See FIG. 4. The user grips the handle 84 with the fingers of one hand and extends the thumb from the same hand over and against thumb lever section 104, and pulls thumb lever section 104 back toward handle 84, thereby pivoting lid 82 open against the biasing of lid spring 94.

Trigger mechanism 90 alternatively includes a lever 92 hingedly connected to or simply abutting a short lid overhang segment 82a protruding beyond the basket rim 34 and lid hinge 86, lever 92 being mounted below, generally parallel to and spaced apart from handle 84. See FIG. 5. Lever 92 includes a fulcrum 96 which is secured to a fulcrum point P1 along the length of the handle 84, creating a lever ratio which swings lid 82 open quickly, upon gripping and squeezing handle 84 and lever 92 together to pivot lever 92 toward the handle 84. The wire mesh lid 82 has minimal mass and the lid spring 94 biasing is light so that only slight mechanical effort is required to open lid 82. Although lid 82 is described and illustrated as pivoting from rear basket wall 24, it is equivalently contemplated that lid 82 pivot from a basket side wall 28 or 32 and be opened with a handle and trigger mechanism as described. In this latter instance, lever 92 engages a lid overhang segment 82a protruding from the side of basket 12.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A fry basket and liner apparatus for immersion in cooking oil in a fryer, comprising:
    a fry basket formed of wire basket mesh for retaining items to be cooked;
    a basket liner fit within said basket and comprising liner mesh having a grid finer than said basket mesh for retaining particles of fried matter separated from the food items, while said basket is immersed in the cooking oil within the fryer;
    such that they do not collect on the interior of the fryer.

2. An apparatus according to claim 1, wherein said basket comprises:
    a basket bottom wall;
    a basket front wall;
    a basket rear wall;
    and two basket side walls,
    wherein said basket front wall, basket rear wall and two basket side walls have upper edges defining in combination a basket rim.

3. An apparatus according to claim 1, wherein said liner comprises:
    a liner bottom wall;
    a liner front wall;
    a liner rear wall;
    and two liner side walls,
    wherein said liner front wall, liner rear wall and two liner side walls have upper edges defining in combination a liner rim.

4. An apparatus according to claim 1, additionally comprising at least one resilient clip for fitting over and holding together said basket rim and said liner rim and thereby releasibly holding said liner within said basket.

5. An apparatus according to claim 4, wherein said at least one clip is a longitudinally split resilient tube longitudinal clip edges and having outwardly protruding radial flanges extending from longitudinal clip edges sized to fit longitudinally over and grip said basket rim and said liner rim.

6. An apparatus according to claim 1, wherein said liner mesh is 500 mesh.

7. An apparatus according to claim 1, wherein said liner mesh is 600 mesh.

8. An apparatus according to claim 2, wherein said fry basket additionally comprises:

a hinged mesh lid forming a basket lid;

and a wire handle having a trigger mechanism including means for opening said lid.

9. An apparatus according to claim 8, wherein said fry basket additionally comprises a lid biasing spring connected to said lid in such a manner as to close said basket lid automatically.

10. An apparatus according to claim 9, wherein said basket lid comprises a lid hinge and an overlapping lid end protruding beyond said basket rim and said lid hinge; and wherein said basket lid opening trigger mechanism comprises:

a lever abutting said overlapping lid end;

a lever fulcrum secured to a fulcrum point along the length of said handle creating a lever ratio swinging said basket lid open upon gripping and squeezing said handle and lever together to pivot said lever toward said handle.

11. A fry basket apparatus for immersion in cooking oil in a fryer, comprising:

a fry basket formed of wire basket mesh for retaining items to be cooked, said fry basket comprising a basket bottom wall and a basket side wall having an upper end defining a basket rim;

a basket lid connected to said basket rim with a lid hinge;

wherein said lid comprises a basket top wall section and a thumb lever section angling upwardly from said top wall section adjacent to said lid hinge.

12. A fry basket apparatus for immersion in cooking oil in a fryer, comprising:

a fry basket formed of wire basket mesh for retaining items to be cooked, said fry basket comprising a basket bottom wall and a basket side wall having an upper end defining a basket rim;

a basket lid connected to said basket rim with a lid hinge;

wherein said fry basket additionally comprises a lid biasing spring connected to said lid in such a manner as to close said basket lid automatically.

13. An apparatus according to claim 12, wherein said basket lid comprises an overlapping lid end protruding beyond said basket rim and said lid hinge; and wherein said basket lid opening trigger mechanism comprises:

a lever abutting said overlapping lid end;

a lever fulcrum secured to a fulcrum point along the length of said handle creating a lever ratio swinging said basket lid open upon gripping and squeezing said handle and lever together to pivot said lever toward said handle.

* * * * *